US012600172B2

(12) United States Patent
Nakano

(10) Patent No.: US 12,600,172 B2
(45) Date of Patent: Apr. 14, 2026

(54) TIRE

(71) Applicant: Sumitomo Rubber Industries, Ltd., Kobe (JP)

(72) Inventor: Kosuke Nakano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 19/039,829

(22) Filed: Jan. 29, 2025

(65) Prior Publication Data

US 2025/0262895 A1     Aug. 21, 2025

(30) Foreign Application Priority Data

Feb. 16, 2024     (JP) ................................. 2024-022299

(51) Int. Cl.
*B60C 11/03* (2006.01)
*B60C 11/12* (2006.01)
*B60C 11/00* (2006.01)

(52) U.S. Cl.
CPC ...... *B60C 11/0302* (2013.01); *B60C 11/0306* (2013.01); *B60C 11/1204* (2013.01); *B60C 11/1236* (2013.01); *B60C 11/1263* (2013.01); *B60C 2011/0016* (2013.01); *B60C 2011/0348* (2013.01); *B60C 2011/0353* (2013.01);
(Continued)

(58) Field of Classification Search
CPC ............. B60C 11/1236; B60C 11/0302; B60C 11/1263; B60C 2011/0016; B60C 2011/1213; B60C 2011/0381; B60C 2011/0353; B60C 2011/1295; B60C 2011/0348; B60C 2011/1227
See application file for complete search history.

(56) References Cited

U.S. PATENT DOCUMENTS

2008/0156405 A1* 7/2008 Tanabe .................... B60C 11/12
152/209.18
2016/0114629 A1* 4/2016 Hashimoto ............. B60C 11/12
152/209.1
(Continued)

FOREIGN PATENT DOCUMENTS

DE     102007061148 A1     6/2009
DE     102020132609 A1     6/2021
(Continued)

OTHER PUBLICATIONS

Machine translation for Japan 03-035803 U (Year: 2025).*
(Continued)

*Primary Examiner* — Steven D Maki
(74) *Attorney, Agent, or Firm* — XSENSUS LLP

(57)     ABSTRACT

A tire has a tread portion provided with grooves including first oblique grooves, second oblique grooves, first shoulder longitudinal grooves, and first crown longitudinal grooves. Each first oblique groove terminates in conjunction with one of the second oblique grooves. Each second oblique groove terminates in conjunction with one of the first oblique grooves. The blocks include crown blocks, first shoulder blocks, and first middle blocks. Each block has a ground contacting surface provided with sipes. A sipe density SDc of each crown block, a sipe density SDm of each first middle block, and a sipe density SDs of each first shoulder block satisfy SDc>SDs and SDm>SDs.

15 Claims, 7 Drawing Sheets

(52) U.S. Cl.
CPC ................. *B60C 2011/0381* (2013.01); *B60C 2011/1213* (2013.01); *B60C 2011/1227* (2013.01); *B60C 2011/129* (2013.01)

(56) References Cited

U.S. PATENT DOCUMENTS

| | | | | |
|---|---|---|---|---|
| 2022/0153065 A1* | 5/2022 | Arai | .................... | B60C 11/1204 |
| 2022/0176748 A1* | 6/2022 | Harada | ................... | B60C 11/12 |

FOREIGN PATENT DOCUMENTS

| | | | | | |
|---|---|---|---|---|---|
| EP | 0609195 | A1 | 8/1994 | | |
| EP | 1106394 | A2 * | 6/2001 | .............. | B60C 11/11 |
| EP | 4552861 | A1 | 5/2025 | | |
| JP | S61-36002 | A | 2/1986 | | |
| JP | 03-035803 | U * | 4/1991 | | |
| JP | H03-35803 | U | 4/1991 | | |
| JP | 2000-142035 | A | 5/2000 | | |
| JP | 2014-129008 | A | 7/2014 | | |
| JP | 2022-080118 | A | 5/2022 | | |
| WO | 2013/015799 | A1 | 1/2013 | | |
| WO | 2014/196409 | A1 | 12/2014 | | |
| WO | 2020/217964 | A1 | 10/2020 | | |

OTHER PUBLICATIONS

Machine translation for Europe 1106394 (Year: 2025).*
Partial translation of Japan 03-035803 U (Year: 2025).*
Extended European search report issued on Jul. 4, 2025, in corresponding European patent Application No. 25152468.2, 90 pages.

* cited by examiner

TIRE

CROSS-REFERENCE TO RELATED APPLICATION

This application claims the benefit of foreign priority to Japanese Patent Applications No. JP2024-022299, filed Feb. 16, 2024, which are incorporated by reference in its entirety.

FIELD OF THE INVENTION

The present disclosure relates to a tire.

BACKGROUND OF THE INVENTION

Japanese unexamined patent application publication No. 2022-080118 has proposed a tire having a tread portion provided with a plurality of first oblique grooves, a plurality of second oblique grooves, and a plurality of first longitudinal grooves each communicating with two first oblique grooves adjacent to each other, for example. This tire is expected to maintain dry performance and improve on-ice/on-snow performance by specifying the groove width of the first longitudinal grooves.

SUMMARY OF THE INVENTION

In recent years, as vehicle performance has improved, further improvement in the on-ice/on-snow performance is required for all-season tires that are used on both dry roads and icy and snowy roads. One way to improve the on-ice/on-snow performance would be to provide more sipes in the land regions of the tread portion. However, depending on the arrangement of the sipes, this method may excessively decrease the rigidity of the land regions, and thus impair the dry performance.

The present disclosure was made in view of the above, and a primary object thereof is to provide a tire with improved on-ice/on-snow performance while maintaining the dry performance.

The present disclosure is a tire having a tread portion bound with an intended tire rotational direction, wherein the tread portion including:

a first tread edge;

a second tread edge;

a plurality of grooves provided between the first tread edge and the second tread edge; and a plurality of blocks divided by the grooves, wherein the grooves include a plurality of first oblique grooves, a plurality of second oblique grooves, a plurality of first shoulder longitudinal grooves, and a plurality of first crown longitudinal grooves, each of the first oblique grooves extends obliquely to a heel side in the tire rotational direction at least from the first tread edge toward a tire equator side, each of the second oblique grooves extends obliquely to the heel side in the tire rotational direction at least from the second tread edge toward the tire equator side, each of the first shoulder longitudinal grooves extends in the tire circumferential direction so as to communicate with a respective two of the first oblique grooves adjacent to each other in the tire circumferential direction, the first crown longitudinal grooves are disposed between the first shoulder longitudinal grooves and the tire equator and each communicate with two of the first oblique grooves adjacent thereto on both sides in the tire circumferential direction, each of the first oblique grooves terminates in conjunction with one of the second oblique grooves, each of the second oblique grooves terminates in conjunction with one of the first oblique grooves, the blocks include a plurality of crown blocks, a plurality of first shoulder blocks, and a plurality of first middle blocks, the crown blocks are arranged on the tire equator, each of the first shoulder blocks includes the first tread edge and is demarcated by a respective two of the first oblique grooves adjacent to each other in the tire circumferential direction and a respective one of the first shoulder longitudinal grooves between the respective two of the first oblique grooves, the first middle blocks are disposed between the crown blocks and the first shoulder blocks, each of the first shoulder blocks, the first middle blocks, and the crown blocks has a ground contacting surface provided with a plurality of sipes, and for each of the blocks, when a sipe density (mm/mm²) is defined as a value of a total length (mm) of the sipes formed on the ground contacting surface divided by an area (mm²) of the ground contacting surface, a sipe density $SD_c$ of each of the crown blocks, a sipe density $SD_m$ of each of the first middle blocks, and a sipe density $SD_s$ of each of the first shoulder blocks satisfy $SD_c > SD_s$ and $SD_m > SD_s$.

By adopting the above-mentioned configuration, it is possible that the tire of the present disclosure improves the on-ice/on-snow performance while maintaining the dry performance.

DETAILED DESCRIPTION OF THE INVENTION

An embodiment of the present disclosure will now be described in conjunction with accompanying drawings. The drawings are described to incorporate the features of the present disclosure, but may include exaggerated expressions or expressions different from the actual dimensional ratios of the structures in order to aid in understanding the present disclosure. Further, throughout the embodiments, identical or common elements are assigned with the same reference signs, and redundant explanations are omitted. Furthermore, well-known configurations can be adopted as appropriate for configurations not described in the present specification.

Figure 1:
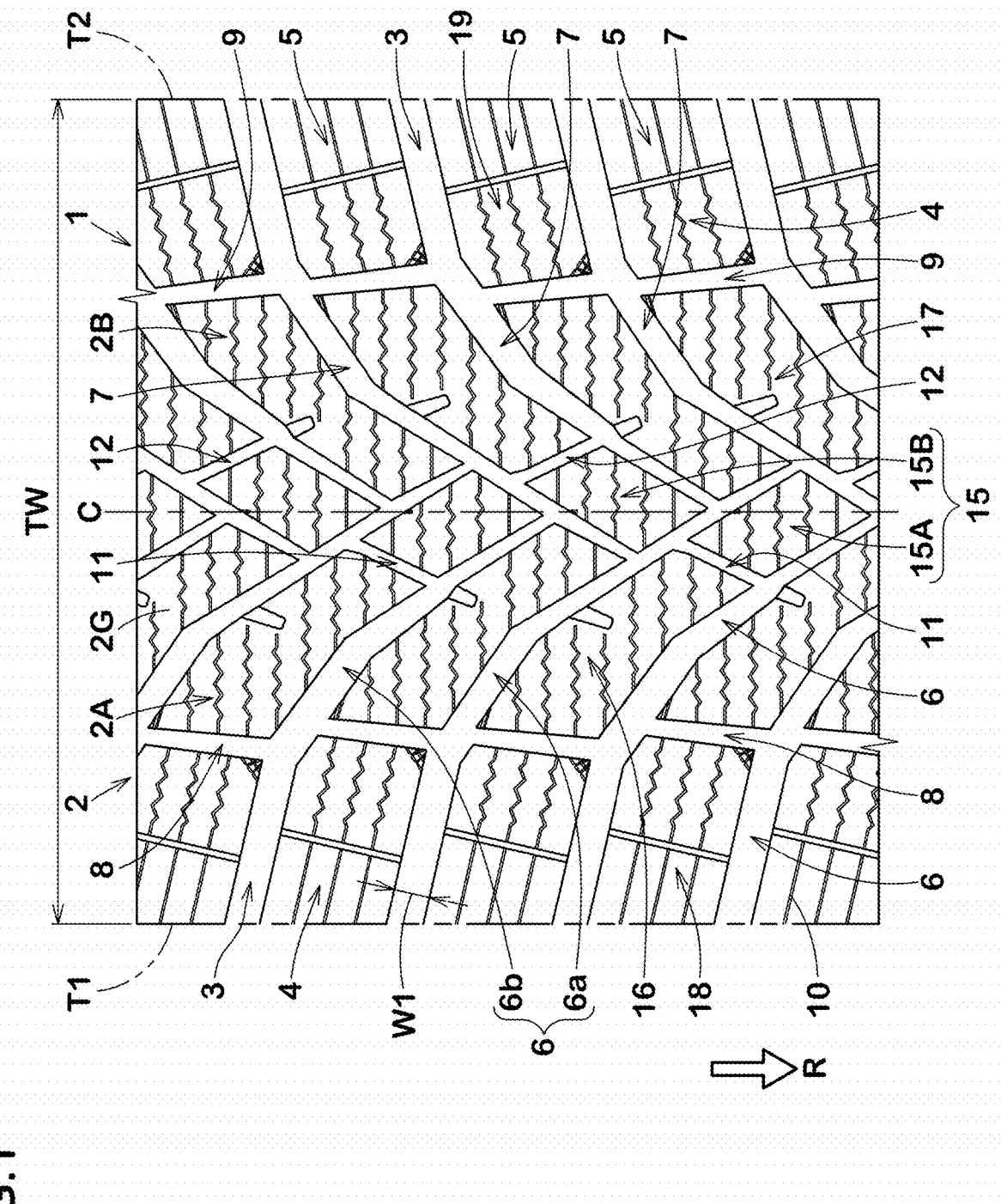
FIG. 1 is a development view of a tread portion of a tire according to an embodiment of the present disclosure.

FIG. 1 shows a development view of a tread portion 2 of a tire 1 according to the present embodiment. As shown in FIG. 1, the tire 1 of the present embodiment is a pneumatic tire for passenger cars, and is used as a so-called all-season tire that combines sufficient dry performance with sufficient on-ice/on-snow performance. However, the tire of the present disclosure is not limited to such a mode.

The tire 1 of the present disclosure has the tread portion 2 bound with an intended tire rotational direction (R). The tire rotational direction (R) is indicated by letters or symbols on a sidewall portion (not shown), for example.

The tread portion 2 of the tire 1 in the present embodiment includes a first tread edge T1 on one side in the tire axial direction and a second tread edge T2 on the other side in the tire axial direction. In each drawing in the present specification, the tread edge on the left side of the tire equator (C) is designated as the first tread edge T1, and the tread edge on the right side of the tire equator (C) is designated as the second tread edge T2. The tread portion 2 includes a first tread portion 2A demarcated between the tire equator (C) and the first tread edge T1, and a second tread portion 2B demarcated between the tire equator (C) and the second tread edge T2. The first tread portion 2A and the second tread portion 2B are configured to be substantially line-symmetrical about the tire equator (C) except that they are misaligned in a tire circumferential direction. Therefore, each configuration of the first tread portion 2A can be applied to the second tread portion 2B.

The first tread edge T1 and the second tread edge T2 correspond to the axial edges of a ground contact surface of the tire 1 when the tire 1 in a standard state is in contact with a flat surface with zero camber angle by being loaded with 70% of a standard tire load.

In the case of a tire for which various standards have been established, the "standard state" refers to a state in which the tire 1 is mounted on a standard rim (not shown), inflated to a standard inner pressure, and loaded with no tire load. In the case of a tire for which various standards have not been established, the standard state means a standard use state according to the intended use of the tire, in which the tire is not mounted on a vehicle and is loaded with no tire load. In the present specification, unless otherwise noted, the dimensions of various parts of the tire are values measured in the standard state described above.

The "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" refers to air pressure specified for the concerned tire by a standard included in a standardization system on which the tire is based, for example, the maximum air pressure in JATMA, the maximum value listed in the "TIRE LOAD LIMITS AT VARIOUS COLD INFLATION PRESSURES" table in TRA, and "INFLATION PRESSURE" in ETRTO.

In the case of a tire for which various standards have been established, the "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of a tire for which various standards have not been established, the "standard tire load" refers to the maximum load that can be applied when using the tire in accordance with the above-mentioned standards.

The tread portion 2 includes a plurality of grooves 3 provided between the first tread edge T1 and the second tread edge T2, and a plurality of blocks 4 demarcated by the grooves 3.

The grooves 3 include a plurality of first oblique grooves 6, a plurality of second oblique grooves 7, a plurality of first shoulder longitudinal grooves 8, and a plurality of first crown longitudinal grooves 11. The first oblique grooves 6 extend at least from the first tread edge T1 toward the tire equator (C) side, inclining toward a heel side (leading side) in the tire rotational direction (R). The second oblique grooves 7 extend at least from the second tread edge T2 toward the tire equator (C) side at an angle toward the heel side in the tire rotational direction (R). Each of the first oblique grooves 6 and the second oblique grooves 7 has a groove width W1 in the range from 2 to 12 mm. Further, each of the first oblique grooves 6 and the second oblique grooves 7 has a depth in the range from 5 to 12 mm.

It should be noted that, when the numerical ranges of various parameters are described in the present specification, the numerical ranges mean the numerical ranges for the average values of the parameters unless otherwise specified. Therefore, the above-mentioned numerical ranges of the groove width and the depth of the oblique grooves refer to the average numerical ranges of the groove width and the depth measured at multiple positions on the inclined grooves. The same applies to other parameters described below.

Each of the first shoulder longitudinal grooves 8 extends in the tire circumferential direction so as to communicate with two of the first oblique grooves 6 adjacent to each other in the tire circumferential direction. In other words, each of the first shoulder longitudinal grooves 8 extends in the tire circumferential direction so as to connect a respective one of the first oblique grooves 6 with another first oblique grooves 6 adjacent thereto in the tire circumferential direction. The first crown longitudinal grooves 11 are disposed between the first shoulder longitudinal grooves 8 and the tire equator (C) and each communicate with two first oblique grooves 6, i.e., each of the first crown longitudinal grooves 11 connects a respective one of the first oblique grooves 6 with another first oblique grooves 6 adjacent thereto in the tire circumferential direction.

In the present embodiment, the grooves 3 include a plurality of second shoulder longitudinal grooves 9 and a plurality of second crown longitudinal grooves 12 arranged in the second tread portion 2B. The second shoulder longitudinal grooves 9 have essentially the same features (configuration) as the first shoulder longitudinal grooves 8. Further, the second crown longitudinal grooves 12 have substantially the same features (configuration) as the first crown longitudinal grooves 11. Therefore, the features (configuration) of the first shoulder longitudinal grooves 8 described below may also be applied to the second shoulder longitudinal grooves 9. The first crown longitudinal grooves 11 and the second crown longitudinal grooves 12 have a similar relationship, i.e., the features (configuration) of the first crown longitudinal grooves 11 described below may also be applied to the second crown longitudinal grooves 12.

In the present disclosure, each of the first oblique grooves 6 communicates with and terminates in one of the second oblique grooves 7. Further, each of the second oblique grooves 7 communicates with and terminates in one of the first oblique grooves 6.

The blocks 4 include crown blocks 15, first shoulder blocks 18, and first middle blocks 16. The crown blocks 15 in the present embodiment include first crown blocks 15A and second crown blocks 15B arranged alternately in the tire circumferential direction. Each of the first crown blocks 15A is demarcated by two first oblique grooves 6, one second oblique groove 7, and one first crown longitudinal groove 11. Each of the second crown blocks 15B is demarcated by two second oblique grooves 7, one first oblique groove 6, and one second crown longitudinal groove 12.

Each of the first shoulder blocks 18 includes the first tread edge T1 and is demarcated by two first oblique grooves 6 and one first shoulder longitudinal groove 8. The first middle blocks 16 are disposed between the crown blocks 15 and the first shoulder blocks 18.

In the present embodiment, the blocks 4 further include second shoulder blocks 19 and second middle blocks 17. The second shoulder blocks 19 have substantially the same features (configuration) as the first shoulder blocks 18. The second middle blocks 17 have substantially the same features (configuration) as the first middle blocks 16. Therefore, the features of the first shoulder blocks 18 described below may also be applied to the second shoulder blocks 19. The first middle blocks 16 and the second middle blocks 17 have a similar relationship, i.e., the features (configuration) of the first middle blocks 16 described below may also be applied to the second middle blocks 17.

Figure 2:
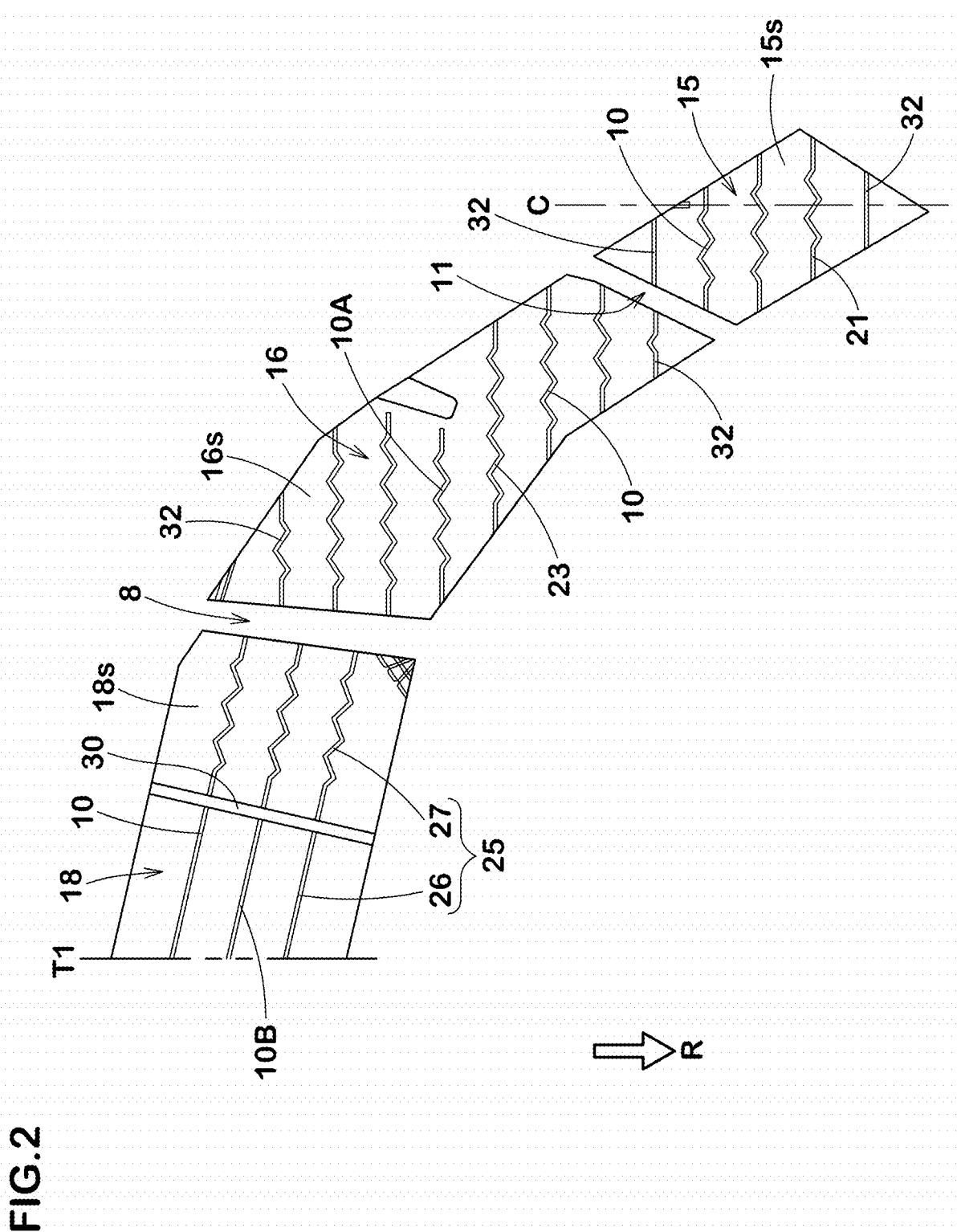
FIG. 2 is an enlarged view of one of crown blocks, one of first middle blocks, and one of first shoulder blocks of FIG. 1.

FIG. 2 shows an enlarged view of one of the crown blocks 15, one of the first middle blocks 16, and one of the first shoulder blocks 18. As shown in FIG. 2, a ground contacting surface (18s) of each of the first shoulder blocks 18, a ground contacting surface (16s) of each of the first middle blocks 16, and a ground contacting surface (15s) of each of the crown blocks 15 are each provided with a plurality of sipes 10. Hereinafter, the sipes 10 formed on the crown blocks 15 may be referred to as crown sipes 21, the sipes 10 formed on the first middle blocks 16 may be referred to as middle sipes 23, and the sipes 10 formed on the first shoulder blocks 18 may be referred to as shoulder sipes 25.

In the present specification, the "sipe" means an incision with a small width, in which two sipe walls included in a sipe main body come into contact with each other when a ground contact load acts on the tread portion 2, and thus the rigidity of a block can be maintained. The sipe main body means a portion where the two sipe walls extend approximately parallel to each other (10 degrees or less, for example) in a tire radial direction. Further, from the point of view of exerting the above-mentioned effects, the width between the two sipe walls in the sipe main body is 1.5 mm or less, preferably from 0.4 to 1.2 mm, and more preferably from 0.4 to 1.0 mm, for example. Each of the sipes in the present embodiment extends with a constant width from an opening portion thereof to a bottom portion thereof. It should be noted that the sipes may have chamfered portions formed on their edges. Furthermore, the sipes may also have so-called flask bottoms with the width increased at their bottoms.

For each of the blocks, when a sipe density (mm/mm$^2$) is defined as a value of a total length (mm) of the sipes 10 formed on the ground contacting surface divided by an area (mm$^2$) of the ground contacting surface, a sipe density SDc of each of the crown blocks 15, a sipe density SDm of each of the first middle blocks 16, and a sipe density SDs of each of the first shoulder blocks 18 satisfy the following Expressions (1) and (2) in the present disclosure. As a result, it is possible that the tire of the present disclosure improves the on-ice/on-snow performance while maintaining the dry performance. The reasons for this are as follows.

$$SDc > SDs \qquad \text{Expression (1)}$$

$$SDm > SDs \qquad \text{Expression (2)}$$

As shown in FIG. 1, in tire 1 of the present disclosure, each of the first oblique grooves 6 terminates in conjunction with one of the second oblique grooves 7. Further, each of the second oblique grooves 7 terminates in conjunction with one of the first oblique grooves 6. Therefore, in the tire 1 of the present disclosure, the communicating parts of these grooves firmly compact the snow and thus exert a large snow shearing force during running on an icy/snowy road. Furthermore, since the ground contacting surface of each of the blocks is provided with multiple sipes 10, these edges provide a large frictional force even on an icy/snowy road. Thereby, the on-ice/on-snow performance is improved.

Figure 3:
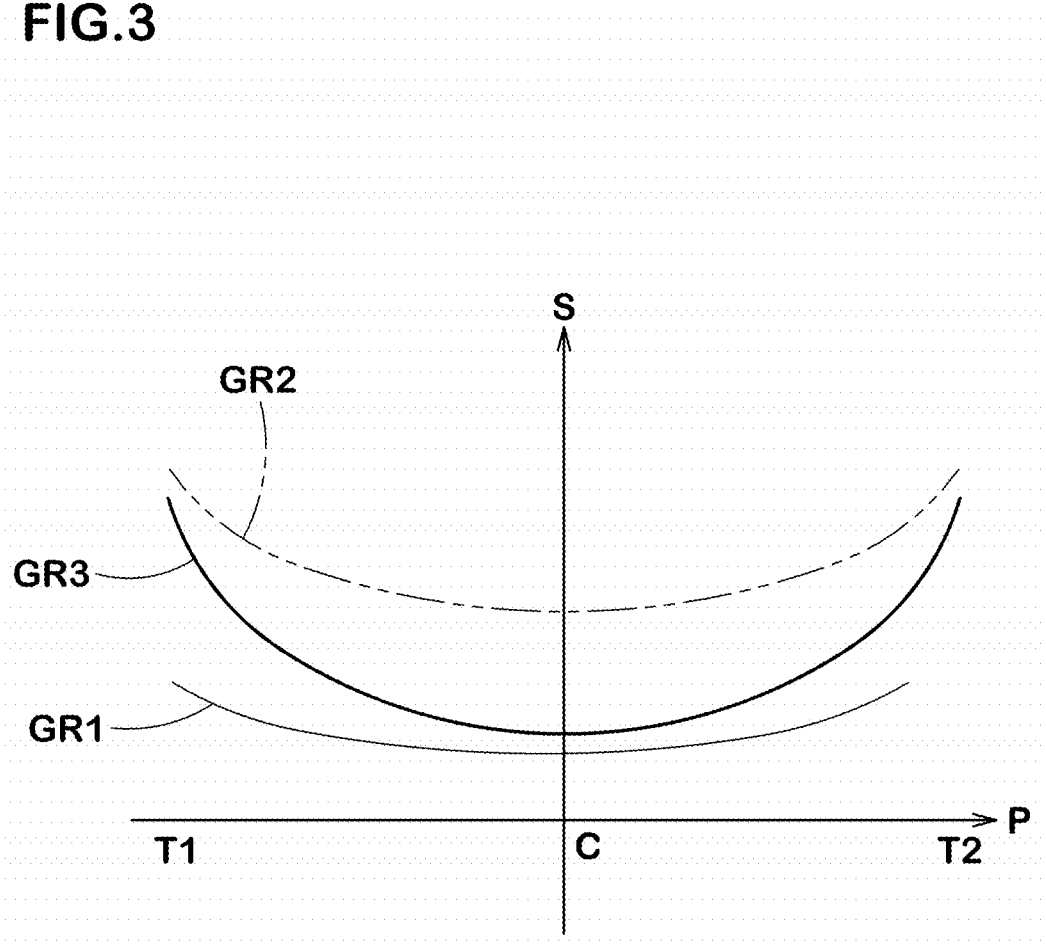
FIG. 3 is a conceptual graph of rigidity distribution of the tread portions of various tires.

FIG. 3 shows a conceptual graph of the rigidity distribution of the tread portions of various tires. The horizontal axis (P) in FIG. 3 indicates the axial position in the tread portion, with the center position corresponding to the tire equator (C), the left side corresponding to the first tread edge T1 side, and the right side corresponding to the second tread edge T2 side. The vertical axis(S) in FIG. 3 indicates the rigidity of various parts of the tread portion. The graph GR1 in FIG. 3 shows the rigidity distribution of a conventional studless tire. The graph GR2 shows the rigidity distribution of a conventional summer tire. The graph GR3 shows the rigidity distribution of the tire 1 in the present embodiment.

As can be seen from the graphs GR1 and GR2 in FIG. 3, the studless tire that is designed with an emphasis on the on-ice/on-snow performance has an overall low rigidity of the tread portion due to the provision of many sipes in the tread portion. On the other hand, the conventional summer tire, which is not designed for running on icy and snowy roads and are designed with an emphasis on the dry performance, has a relatively high rigidity in the tread portion.

The inventors have conducted extensive research into the degree of contribution of various parts of the tread portion during running on dry roads and during running on icy/snowy roads. As a result, the inventors have found that it is preferred to maintain the rigidity of the shoulder blocks in order to maintain the dry performance, while it is preferred to decrease the rigidity of the middle blocks and the crown blocks by providing many sipes in the middle blocks and the crown blocks in order to improve the on-ice/on-snow performance.

Based on this knowledge, in the present disclosure, the sipe density of each of the blocks satisfies the Expressions (1) and (2) described above. Therefore, as shown in graph GR3 in FIG. 3, in the tread portion 2 of the tire 1 of the present disclosure, the first shoulder blocks 18 provide high rigidity and maintain the dry performance, while the first middle blocks 16 and the crown blocks 15 provide large friction force by the sipes 10, thereby, the on-ice/on-snow performance is improved. Due to this mechanism, it is possible that the tire 1 of the present disclosure improves the on-ice/on-snow performance while maintaining the dry performance, compared to conventional all-season tires.

As shown in FIG. 2, from the point of view of achieving a well-balanced improvement in the dry performance and the on-ice/on-snow performance, the sipe density SDs of the first shoulder blocks 18 is in the range from 0.10 to 0.15 (mm/mm²), and preferably in the range from 0.12 to 0.14 (mm/mm²), for example. Similarly, the sipe density SDc of the crown blocks 15 and the sipe density SDm of the first middle blocks 16 are in the range from 0.17 to 0.23 (mm/mm²), and preferably in the range from 0.20 to 0.22 (mm/mm²), for example.

Further, it is preferred that the sipe density SDc of the crown blocks 15 and the sipe density SDm of the first middle blocks 16 are each in the range from 140% to 160% of the sipe density SDs. Thereby, excellent on-ice/on-snow performance is exerted while uneven wear of the first middle blocks 16 and the crown blocks 15 is suppressed.

It is preferred that the sipe density SDc of the crown blocks 15 is in the range from 80% to 120% of the sipe density SDm of the first middle blocks 16. Therefore, the uneven wear of these blocks is further suppressed.

More detailed configurations of the present embodiment will be described below. It should be noted that each configuration described below shows a specific aspect of the present embodiment. Therefore, it goes without saying that the present disclosure can achieve the effects described above even if it does not have the configuration described below. Further, even if any one of the configurations described below is applied alone to the tire 1 of the present disclosure having the above-described features, an improvement in performance according to the applied configuration can be expected. Furthermore, when some of the configurations described below are applied in combination, a combined improvement in performance according to these configurations applied can be expected.

As shown in FIG. 1, the tread portion 2 includes a tread rubber 2G forming the ground contacting surfaces of the blocks 4. From the point of view of improving the dry performance and the on-ice/on-snow performance, the rubber hardness of the tread rubber 2G is in the range from 50 to 65 degrees, for example. It should be noted that the rubber hardness in the present specification refers to hardness measured by a type-A durometer measured in an environment of 23 degrees Celsius in accordance with the Japanese Industrial Standards JIS-K6253.

From a similar point of view, the land ratio of the tread portion 2 is in the range from 65% to 75%. It should be noted that the term "land ratio" in the present specification corresponds to the ratio of the actual ground contact surface area to the virtual ground contact surface area in a state in which all grooves and sipes in the tread portion 2 are filled.

Conventional all-season tires place emphasis on wet performance, and often have the tread width about 65% to 70% of the nominal width of the tire. In contrast, a tread width TW of the tire 1 in the present embodiment is set to from 75% to 85% of the nominal width of the tire, and more preferably to 80% or more of the nominal width. Therefore, the tread portion 2 has a sufficiently large ground contacting area, thereby, it is possible that excellent grip is exerted on dry roads and icy/snowy roads. It should be noted that the above-mentioned nominal width of the tire corresponds to the nominal cross-sectional width of the tire. In other words, if the tire size is "195/65R15", for example, the nominal width is 195 mm.

The tread portion 2 has a plurality of V-shaped block groups 5 arranged in the tire circumferential direction. Each of the block groups includes one of the crown blocks 15, one of the first middle blocks 16, one of the second middle blocks 17, one of the first shoulder blocks 18, and one of the second shoulder blocks 19 adjacent in the tire axial direction so as to form a V-shape. The tread portion 2 in the present embodiment is composed of 55 to 78 of the block groups 5 arranged over the entire circumference of the tire. However, the present disclosure is not limited to such an embodiment.

As shown in FIG. 2, each of the sipes 10 is disposed at an angle of 15 degrees or less with respect to the tire axial direction. It should be noted that this configuration means that the angle of an imaginary linear line connecting both ends of each sipe 10 with respect to the tire axial direction is 15 degrees or less. In a preferred embodiment, all of the sipes 10 formed on the tread portion 2 are arranged in the manner described above. Such an embodiment reliably improves traction performance and braking performance on icy/snowy roads, which are particularly important for all-season tires.

The sipes 10 of the present embodiment include sipes 10A (first sipes) each extending in a zigzag shape in a tread plan view and sipes 10B (second sipes) each extending linearly. Each of the sipes 10A extending in a zigzag manner also extends in a zigzag manner in the tire radial direction in a cross section perpendicular to the longitudinal direction thereof, and is configured as a so-called 3D sipe. It is possible that these sipes 10A extending in a zigzag pattern effectively maintain the rigidity of the blocks since the two sipe walls of each of the sipes 10 come into contact with each other so as to engage each other when ground contact pressure is applied.

Each of the first shoulder blocks 18 is provided with a plurality of first shoulder sipes 26 and a plurality of second shoulder sipes 27. Each of the first shoulder sipes 26 extends linearly from a respective one of longitudinal narrow grooves 30 (described later) to at least the first tread edge T1. Each of the second shoulder sipes 27 extends in a zigzag pattern from a respective one of the first shoulder longitudinal grooves 8 to a respective one of the longitudinal narrow grooves 30. Each of the first shoulder blocks 18 has two to four first shoulder sipes 26 arranged in the tire circumferential direction. The same is true for the second shoulder sipes 27, that is, each of the first shoulder blocks 18 has two to four second shoulder sipes 27 arranged in the tire circumferential direction. Therefore, each of the first shoulder blocks 18 has four to eight sipes 10 arranged therein.

Figure 4:
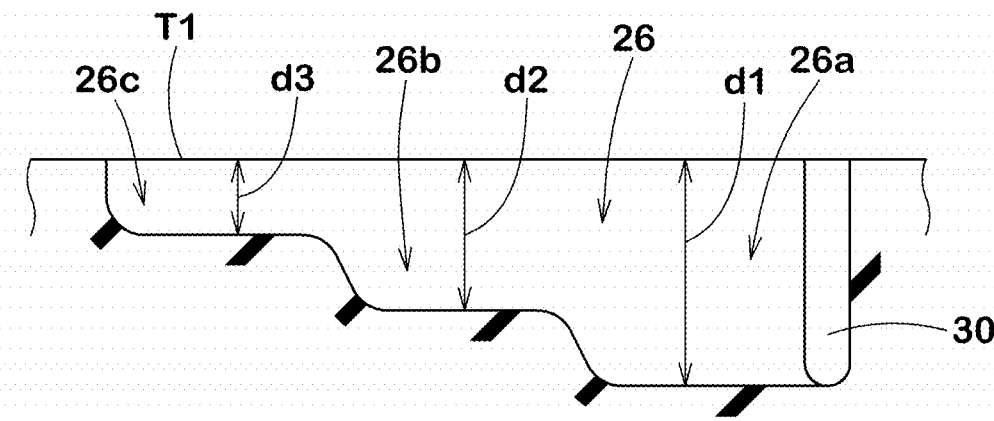
FIG. 4 is an enlarged cross-sectional view of one of first shoulder sipes of FIG. 2 taken along the longitudinal direction thereof.

FIG. 4 is an enlarged cross-sectional view of one of the first shoulder sipes 26 taken along the longitudinal direction thereof. As shown in FIG. 4, each of the first shoulder sipes 26 has a depth that gradually decreases from the end on the tire equator (C) side toward the first tread edge T1 side. Each of the first shoulder sipes 26 includes a first portion (26a), a second portion (26b), and a third portion (26c), which have different depths from each other and arranged in this order from the end thereof on the longitudinal narrow groove 30 side toward the end thereof on the first tread edge T1 side. The first portion (26a) has a depth (d1) which is the maximum depth of the sipe. The depth (d1) is in the range from 65% to 80% of the maximum depth of the first oblique grooves 6 (not shown), for example. Further, the length of the first portion (26a) in the tread plan view (this is the so-called periphery length along the longitudinal direction of the sipe, and the same applies hereinafter) is in the range from 25% to 35% of the entire length of the each of the first shoulder sipes 26 on the ground contacting surface (18s) of the respective one of the first shoulder blocks 18, for example.

The second portion (26b) has a depth d2 which is smaller than the depth (d1). The depth d2 is in the range from 60% to 75% of the depth (d1), for example. Further, the length of the second portion (26b) in the tread plan view is in the range from 25% to 35% of the entire length of the respective one of the first shoulder sipes 26. The third portion (26c) has a depth (d3) which is smaller than the depth d2. The depth (d3) is in the range from 25% to 40% of the depth (d1), for example. Further, the length of the third portion (26c) in the tread plan view is in the range from 25% to 35% of the entire length of the respective one of the first shoulder sipes 26. The first shoulder sipes 26 having the depth distribution configured as such helps to improve the dry performance and the on-ice/on-snow performance in a good balance.

Figure 5:
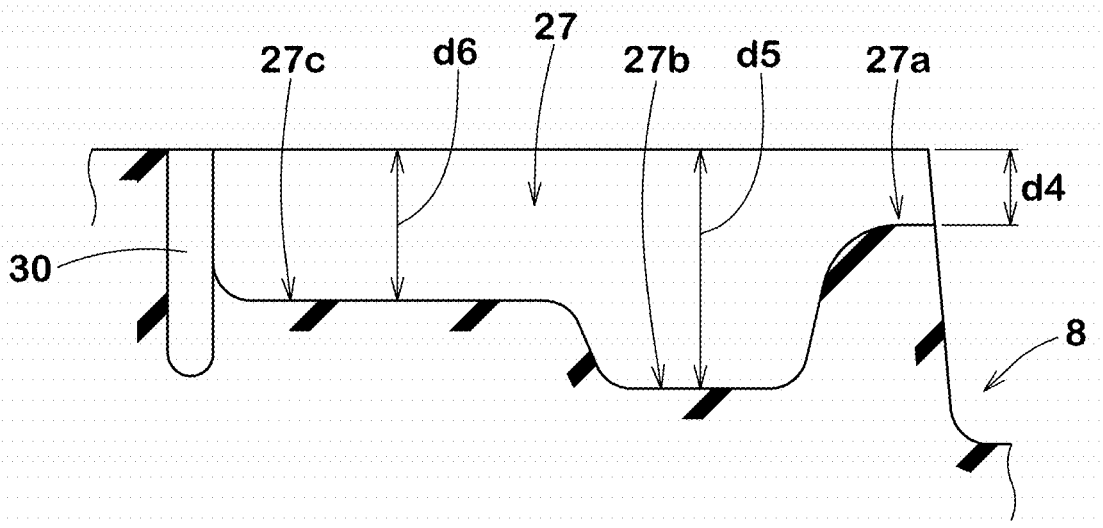
FIG. 5 is an enlarged cross-sectional view of one of second shoulder sipes of FIG. 2 taken along the longitudinal direction thereof.

FIG. 5 is an enlarged cross-sectional view of one of the second shoulder sipes 27 taken along the longitudinal direction thereof. It should be noted that, since each of the second shoulder sipes 27 extends in a zigzag shape, the sipe walls thereof include projections and recesses and ridges that form the boundaries between them, but these are omitted in FIG. 5. The same applies to drawings showing cross sections of other sipes in the present specification. As shown in FIG. 5, each of the second shoulder sipes 27 includes a first portion (27a) (second first portion), a second portion (27b) (second portion), and a third portion (27c) (second third portion), which have different depths from each other and arranged in this order from the end on the first shoulder longitudinal groove 8 side toward the end on the longitudinal narrow groove 30 side.

The first portion (27a) of each of the second shoulder sipes 27 communicates with the respective one of the first shoulder longitudinal grooves 8 and has the smallest depth in the each of the second shoulder sipes 27. The second portion (27b) has a depth (d5) which is the maximum depth of the each of the second shoulder sipes 27. The first portion (27a) has a depth (d4) that is in the range from 25% to 35% of the depth (d5) of the second portion (27b). Further, the third portion (27c) has a depth (d6) that is greater than the depth (d4) of the first portion (27a) and smaller than the depth (d5) of the second portion (27b). The depth (d6) of the third portion (27c) is in the range from 60% to 70% of the depth (d5) of the second portion (27b), for example. The second shoulder sipes 27 each having the depth distribution configured as such can suppress excessive opening at the ends of the first shoulder longitudinal grooves 8, therefore, the dry performance is effectively maintained.

Further, the length of the first portion (27a) in the tread plan view is in the range from 10% to 25% of the entire length of the respective one of the second shoulder sipes 27. The length of the second portion (27b) in the tread plan view is in the range from 25% to 35% of the entire length of the respective one of the second shoulder sipes 27. The length of the third portion (27c) in the tread plan view is in the range from 40% to 60% of the entire length of the respective one of the second shoulder sipes 27.

Figure 6:
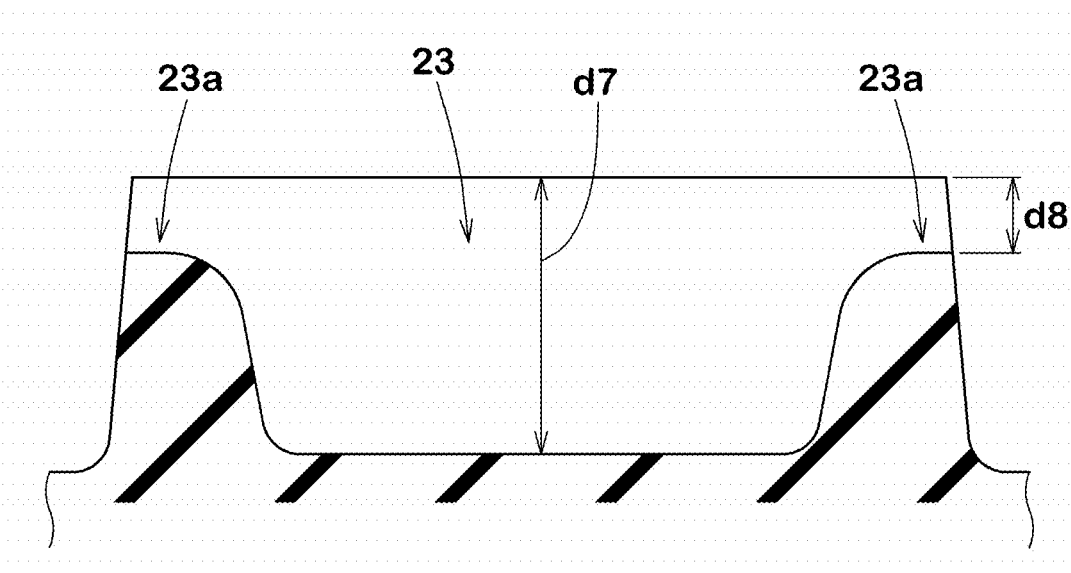
FIG. 6 is an enlarged cross-sectional view of one of middle sipes of FIG. 2 taken along the longitudinal direction thereof.

FIG. 6 is an enlarged cross-sectional view of one of the middle sipes 23 taken along the longitudinal direction thereof. As shown in FIG. 6, each of the middle sipes 23 are formed with shallow bottom portions (23a) at both ends, one at each end, thereof. Each of the shallow bottom portions (23a) has a depth (d8) in the range from 20% to 35% of a maximum depth (d7) of the respective one of the middle sipes 23, for example. It is possible that the middle sipes 23 configured as such prevent opening at both ends thereof and thus improve the on-ice/on-snow performance while reliably maintaining the dry performance. It should be noted that this cross-sectional shape may also be employed for the crown sipes 21 (shown in FIG. 2).

Figure 7:
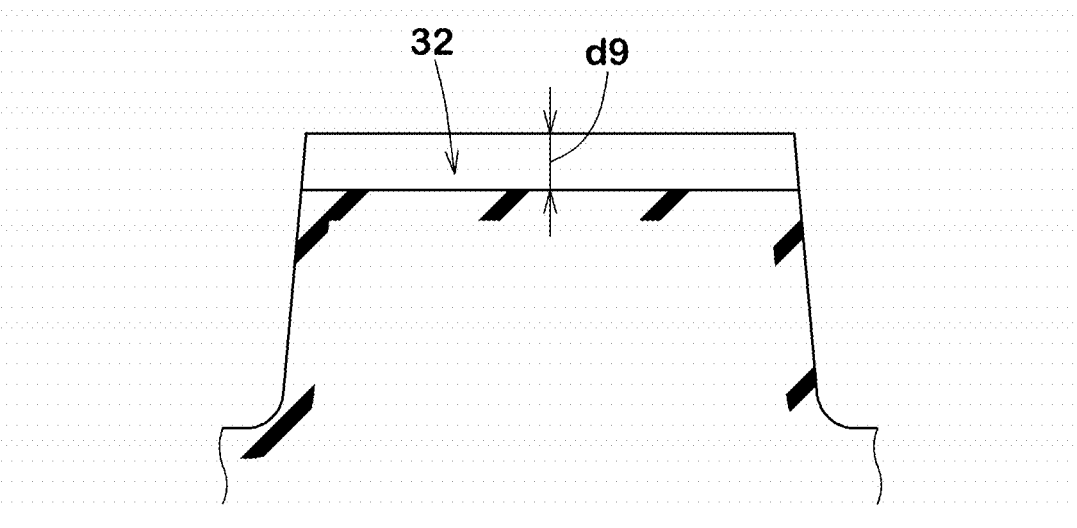
FIG. 7 is an enlarged cross-sectional view of one of shallow sipes of FIG. 2 taken along the longitudinal direction thereof.

As shown in FIG. 2, the first middle blocks 16 and the crown blocks 15 are each provided with a plurality of the sipes 10 each extending in the tire axial direction and arranged in the tire circumferential direction. Of these sipes 10, it is preferred that the sipes 10 provided on the circumferential end portions of each block are configured as shallow sipes 32 in each of the blocks 10. FIG. 7 shows an enlarged cross-sectional view of one of the shallow sipes 32 taken along the longitudinal direction thereof. As shown in FIG. 7, each of the shallow sipes 32 has a depth (d9) in the range from 0.5 to 2.0 mm, for example. By arranging the shallow sipes 32 configured as such at the end portions of the blocks, it is possible that damages such as chipping of the blocks is suppressed.

Figure 8:
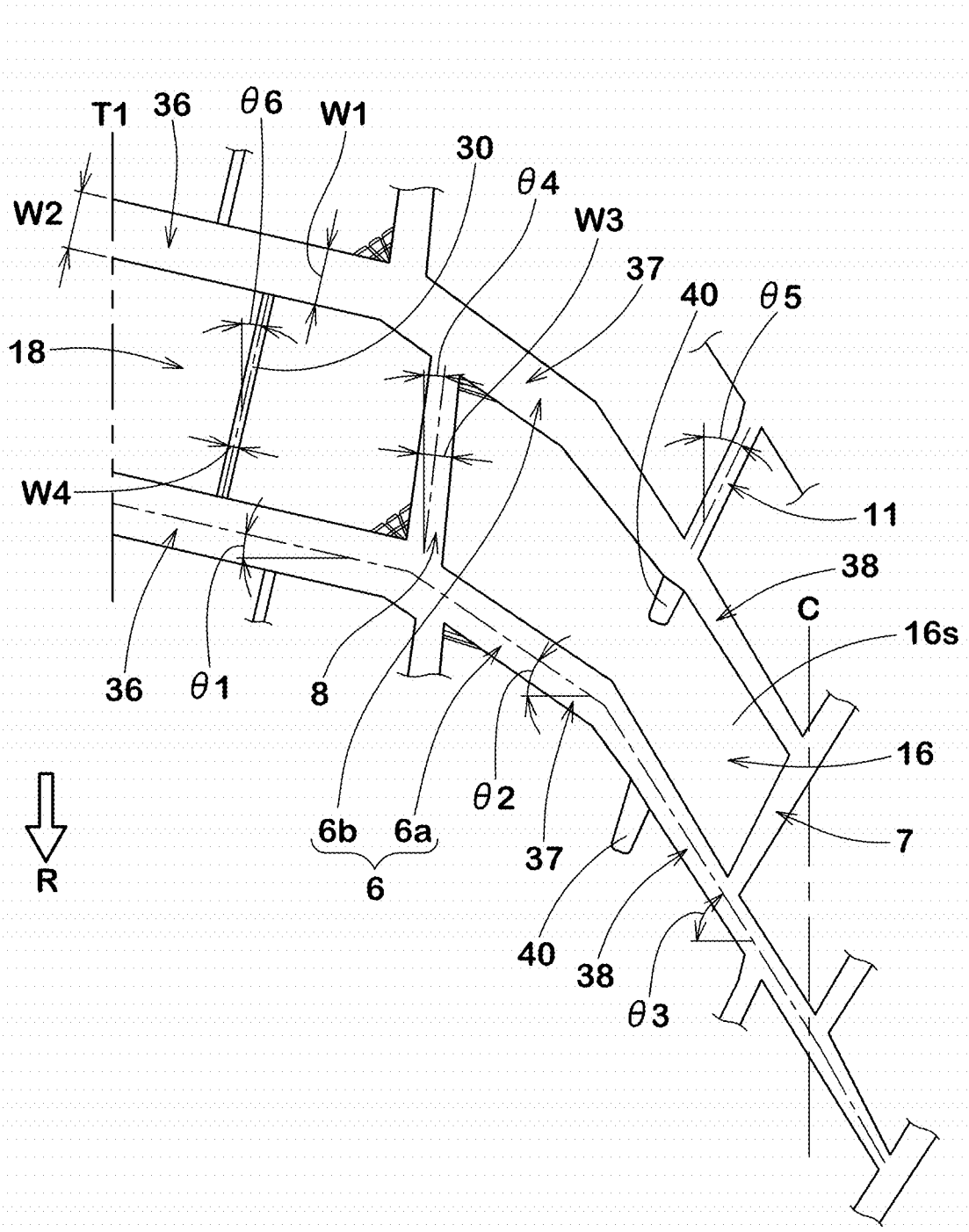
FIG. 8 is an enlarged view of the outline of one of the first oblique grooves of FIG. 1.

FIG. 8 shows an enlarged view of the outline of one of the first oblique grooves 6 in FIG. 1. It should be noted that the sipes arranged in the land region are omitted in FIG. 8. As shown in FIG. 8, the first oblique grooves 6 include main first oblique grooves (6a) and sub first oblique grooves (6b) arranged alternately, one by one in the present embodiment, in the tire circumferential direction, for example. Each of the main first oblique grooves (6a) terminates on the second tread edge T2 (shown in FIG. 1) side of the tire equator (C), i.e., terminates after crossing the tire equator (C). Each of the sub first oblique grooves (6b) terminates without crossing the tire equator (C).

Each of the first oblique grooves 6 has an angle with respect to the tire axial direction increasing toward the tire equator (C), for example. The first oblique grooves 6 configured as such provide the snow shearing force in multiple directions, therefore, they help to improve the on-snow traction performance and on-snow cornering performance.

Each of the first oblique grooves 6 includes a plurality of groove portions extending linearly and obliquely with respect to the tire axial direction, for example. As a preferred embodiment, the total length of the linearly extending groove edges is 80% or more of the total length of the entire groove edges in each of the first oblique grooves 6 of the present embodiment.

Each of the first oblique grooves 6 includes a first groove portion 36, a second groove portion 37, and a third groove portion 38, for example. The first groove portion 36 extends linearly and obliquely with respect to the tire axial direction from at least the first tread edge T1, for example. The second groove portion 37 is continuous with the first groove portion 36 and extends linearly at a larger angle than the first groove portion 36 with respect to the tire axial direction. The third groove portion 38 is continuous with the second groove portion 37 and extends at a larger angle than the second groove portion 37 with respect to the tire axial direction. In the present embodiment, the third groove portion 38 of each of the main first oblique grooves (6a) communicates with a respective one of the second oblique grooves 7 across the tire equator (C), and the third groove portion 38 of each of the sub first oblique grooves (6b) communicates with a respective one of the second oblique grooves 7 without crossing the tire equator (C).

The first groove portion 36 has an angle θ1 in the range from 5 to 15 degrees with respect to the tire axial direction is, for example. The second groove portion 37 has an angle θ2 in the range from 25 to 35 degrees with respect to the tire axial direction is, for example. The third groove portion 38 has an angle θ3 in the range from 45 to 60 degrees with respect to the tire axial direction, for example. Thereby, during running on icy/snowy roads, the edges of each of the groove portions exert frictional forces in multiple directions, therefore, excellent on-ice/on-snow performance is exerted.

It is preferred that the groove width W1 of each of the first oblique grooves 6 decreases from the first tread edge T1 side toward the tire equator (C) side. This makes it easier for water in the first oblique grooves 6 to be guided toward the first tread edge T1 side during running on wet roads, thereby, the wet performance is improved.

The heel side end in the tire rotational direction (R) of each of the first shoulder longitudinal grooves 8 is connected to the groove edge of the first groove portion 36 and the grove edge of the second groove portion 37 of one of the first oblique grooves 6 immediately adjacent thereto on the heel side, for example. In other words, the heel side ed of each of the first shoulder longitudinal grooves 8 is connected to the connection portion between the first groove portion 36 and the second groove portion 37 of one of the first oblique grooves 6 immediately adjacent thereto on the heel side, for example. Further, the toe side end in the tire rotational direction (R) of each of the first shoulder longitudinal grooves 8 is connected to the groove edge of the second groove portion 37 of one of the first oblique grooves 6 immediately adjacent thereto on the toe side. Therefore, each of the first shoulder longitudinal grooves 8 is inclined to the first tread edge T1 side as it goes toward the heel side in the tire rotational direction (R). Each of the first shoulder longitudinal grooves 8 has an angle $\theta 4$ in the range from 5 to 15 degrees with respect to the tire circumferential direction, for example. It is possible that the first shoulder longitudinal grooves 8 configured as such provide large frictional force in the tire axial direction.

It is preferred that each of the first shoulder longitudinal grooves 8 has a groove width continuously increasing toward the heel side in the tire rotational direction (R). Further, it is preferred that a groove width W3 of each of the first shoulder longitudinal grooves 8 is in the range from 50% to 70% of the maximum groove width W2 of each of the first oblique grooves 6. It is possible that the first shoulder longitudinal grooves 8 configured as such uses the rotation of the tire to pack the snow tightly inside, therefore, large snow shearing force is exerted.

Each of the first crown longitudinal grooves 11 communicates with the third groove portions 38 of two first oblique grooves 6 adjacent thereto on both sides in the tire circumferential direction. As a result, as shown in FIG. 2, each of the first crown longitudinal grooves 11 separates a respective one of the crown blocks 15 from a respective one of the first middle blocks 16. In addition, each of the first crown longitudinal grooves 11 is inclined toward the first tread edge T1 side as it goes toward the heel side in the tire rotational direction (R). As shown in FIG. 8, each of the first crown longitudinal grooves 11 has an angle $\theta 5$ in the range from 25 to 35 degrees with respect to the tire circumferential direction, for example. It is possible that the first crown longitudinal grooves 11 configured as such exert a well-balanced frictional force in the tire axial direction and the tire circumferential direction during running on icy/snowy roads.

Each of the first shoulder blocks 18 in the present embodiment is provided with one longitudinal narrow groove 30, for example. Each of the longitudinal narrow grooves 30 extends in the tire circumferential direction so as to communicate with the first groove portions 36 of two of the first oblique grooves 6 immediately adjacent thereto on both sides in the tire circumferential direction. Each of the longitudinal narrow grooves 30 is inclined to the first tread edge T1 side as it goes toward the heel side in the tire rotational direction (R). It is preferred that each of the longitudinal narrow grooves 30 has an angle $\theta 6$ greater than the angle $\theta 4$ of each of the first shoulder longitudinal grooves 8 with respect to the tire circumferential direction. Specifically, the angle $\theta 6$ of each of the longitudinal narrow grooves 30 is in the range from 10 to 25 degrees.

Each of the longitudinal narrow grooves 30 extends linearly with a constant groove width W4. The groove width W4 of each of the longitudinal narrow grooves 30 is smaller than the groove width W3 of each of the first shoulder longitudinal grooves 8 and smaller than the groove width of each of the first crown longitudinal grooves 11. In a preferred embodiment, the groove width W4 of each of the longitudinal narrow grooves 30 is in the range from 10% to 20% of the groove width W3 of each of the first shoulder longitudinal grooves 8. It is possible that the longitudinal narrow grooves 30 configured as such reliably maintains the dry performance.

As shown in FIG. 2, each of the longitudinal narrow grooves 30 is connected and communicates with the first shoulder sipes 26 and the second shoulder sipes 27. However, the tire 1 of the present disclosure is not limited to such a mode.

As shown in FIG. 8, each of the first middle blocks 16 in the present embodiment is provided with one middle short groove 40 that communicates with one of the first oblique grooves 6 immediately adjacent thereto and has a closed end terminating within the ground contacting surface (16s). In a preferred embodiment, the middle short grooves 40 communicating with the sub first oblique grooves (6b) overlap with regions obtained by extending the first crown longitudinal grooves 11 communicating with the sub first oblique grooves (6b) in the longitudinal direction. In other words, it is preferred that each of the sub first oblique grooves (6b) communicates with one of the middle short grooves 40 on the heel side and with one of the first crown longitudinal grooves 11 on the toe side, and that the communicated middle short groove 40 overlaps with the extension of the communicated first crown longitudinal groove 11 extended in the longitudinal direction thereof. With the groove arrangement configured as such, the sub first oblique grooves (6b) and the middle short grooves 40 work together to form hard snow blocks during running on icy/snowy roads, thereby, the on-ice/on-snow performance is further improved.

While detailed description has been made of the tire according to an embodiment of the present disclosure, the present disclosure can be embodied in various forms without being limited to the illustrated embodiment.

Examples

Figure 9:
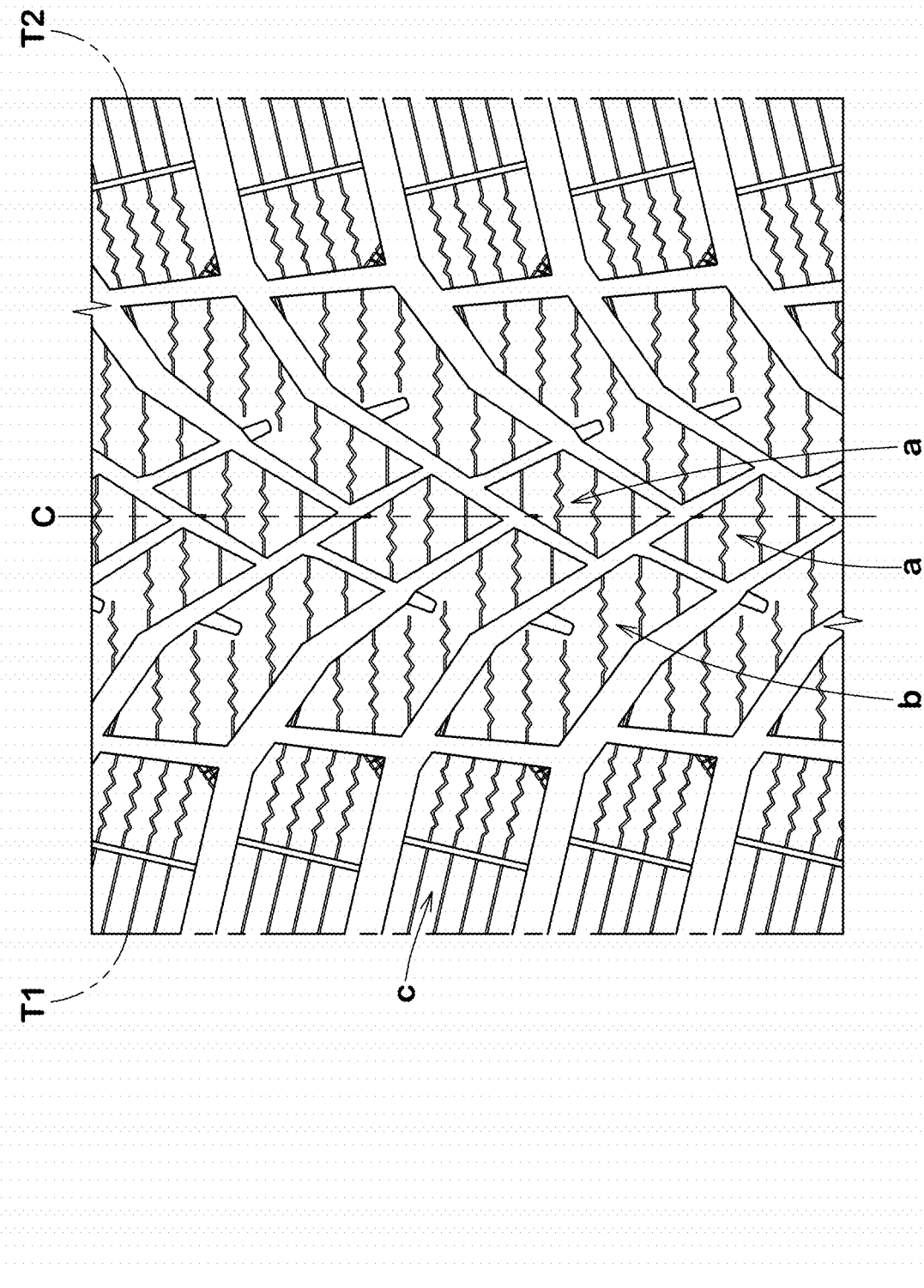
FIG. 9 is a development view of a tread portion of a tire in Reference.

Pneumatic tires of size 195/65R15 having the tread pattern shown in FIG. 1 were made by way of test according to the specifications on Tables 1 and 2. Further, pneumatic tires having the tread pattern shown in FIG. 9 were made by way of test as tires in Reference. As shown in FIG. 9, the sipe density SDc of each of crown blocks (a) and the sipe density SDm of each of first middle blocks (b) are each smaller than the sipe density SDs of each of first shoulder blocks (c) in the tires in the Reference. The tires in the Reference are substantially the same as the tire shown in FIG. 1, except as noted above. Each of the test tires was tested for the dry performance and the on-ice/on-snow performance. The common specifications of the test tires and test methods are as follows:

Test vehicle: front wheel drive car with displacement of 1800 cc

Test tire mounting position: all wheels

Tire rim: 15×6.0

Tire inner pressure: 230 kPa for front wheels, 240 kPa for rear wheels

<Dry Performance>

While a test driver drove the above test vehicle on a dry road surface, running performance was evaluated by the test driver's sensory perception. The test results are indicated by an evaluation point of the running performance, wherein the larger the numerical value, the better the dry performance is.

<On-Ice/On-Snow Performance>

While the test driver drove the above test vehicle on an icy/snowy road surface, the running performance was evaluated by the test driver's sensory perception. The test results are indicated by an evaluation point of the running performance, wherein the larger the numerical value, the better the on-ice/on-snow performance is.

TABLE 1

|  |  | Reference | Example |
|---|---|---|---|
| Figure showing Tread Pattern |  | FIG. 9 | FIG. 1 |
| Dry Performance | [evaluation point] | 6.0 | 5.8 |
| On-ice/On-snow Performance | [evaluation point] | 6.0 | 7.0 |

As shown in Table 1, the tires in the Reference have the dry performance and the on-ice/on-snow performance of 6.0 points. In contrast, the dry performance of the tires in Example is 5.8 points, which is only 0.2 points lower than that of the Reference. On the other hand, the on-ice/on-snow performance of the tires in the Example is 7.0 points, which is improved by 1.0 point compared to the tires in the Reference. As described above, it was confirmed that the tires in the Example exhibited excellent on-ice/on-snow performance while maintaining the dry performance.

STATEMENT OF DISCLOSURE

The present disclosure includes the following aspects.

[Present Disclosure 1]

A tire having a tread portion bound with an intended tire rotational direction, wherein the tread portion including:

a first tread edge;

a second tread edge;

a plurality of grooves provided between the first tread edge and the second tread edge; and a plurality of blocks divided by the grooves, wherein the grooves include a plurality of first oblique grooves, a plurality of second oblique grooves, a plurality of first shoulder longitudinal grooves, and a plurality of first crown longitudinal grooves, each of the first oblique grooves extends obliquely to a heel side in the tire rotational direction at least from the first tread edge toward a tire equator side, each of the second oblique grooves extends obliquely to the heel side in the tire rotational direction at least from the second tread edge toward the tire equator side, each of the first shoulder longitudinal grooves extends in the tire circumferential direction so as to communicate with a respective two of the first oblique grooves adjacent to each other in the tire circumferential direction, the first crown longitudinal grooves are disposed between the first shoulder longitudinal grooves and the tire equator and each communicate with two of the first oblique grooves adjacent thereto on both sides in the tire circumferential direction, each of the first oblique grooves terminates in conjunction with one of the second oblique grooves, each of the second oblique grooves terminates in conjunction with one of the first oblique grooves, the blocks include a plurality of crown blocks, a plurality of first shoulder blocks, and a plurality of first middle blocks, the crown blocks are arranged on the tire equator, each of the first shoulder blocks includes the first tread edge and is demarcated by a respective two of the first oblique grooves adjacent to each other in the tire circumferential direction and a respective one of the first shoulder longitudinal grooves between the respective two of the first oblique grooves, the first middle blocks are disposed between the crown blocks and the first shoulder blocks, each of the first shoulder blocks, the first middle blocks, and the crown blocks has a ground contacting surface provided with a plurality of sipes, and for each of the blocks, when a sipe density (mm/mm²) is defined as a value of a total length (mm) of the sipes formed on the ground contacting surface divided by an area (mm²) of the ground contacting surface, a sipe density SDc of each of the crown blocks, a sipe density SDm of each of the first middle blocks, and a sipe density SDs of each of the first shoulder blocks satisfy SDc>SDs and SDm>SDs.

[Present Disclosure 2]

The tire according to Present Disclosure 1, wherein the sipe density SDs is in the range from 0.10 to 0.15 (mm/mm²).

[Present Disclosure 3]

The tire according to Present Disclosure 1 or 2, wherein each of the sipe density SDc and the sipe density SDm is in the range from 0.17 to 0.23 (mm/mm²).

[Present Disclosure 4]

The tire according to any one of Present Disclosures 1 to 3, wherein each of the sipe density SDc and the sipe density SDm is in the range from 140% to 160% of the sipe density SDs.

[Present Disclosure 5]

The tire according to any one of Present Disclosures 1 to 4, wherein the sipe density SDc is in the range from 80% to 120% of the sipe density SDm.

[Present Disclosure 6]

The tire according to any one of Present Disclosures 1 to 5, wherein a tread width is in the range from 75% to 85% of a nominal width of the tire, and the tread width is a distance in the tire axial direction between the first tread edge and the second tread edge.

[Present Disclosure 7]

The tire according to any one of Present Disclosures 1 to 6, wherein each of the sipes is arranged at an angle of 15 degrees or less with respect to the tire axial direction.

[Present Disclosure 8]

The tire according to any one of Present Disclosures 1 to 7, wherein the blocks include second middle blocks and second shoulder blocks, each of the second middle blocks is adjacent to a respective one of the crown blocks on the second tread edge side via a respective one of the grooves, each of the second shoulder blocks is adjacent to a respective one of the second middle blocks on the second tread edge side via a respective one of the grooves, the tread portion has a plurality of V-shaped block groups arranged in the tire circumferential direction, and each of the block groups includes one of the crown blocks, one of the first middle blocks, one of the second middle blocks, one of the first shoulder blocks, and one of the second shoulder blocks.

[Present Disclosure 9]

The tire according to any one of Present Disclosures 1 to 8, wherein the first oblique grooves include main first oblique grooves and sub first oblique grooves arranged alternately in the tire circumferential direction, each of the main first oblique grooves terminates on the second tread edge side of the tire equator, and each of the sub first oblique grooves terminates without crossing the tire equator.

[Present Disclosure 10]

The tire according to any one of Present Disclosures 1 to 9, wherein each of the first shoulder longitudinal grooves has a groove width continuously increasing toward the heel side in the tire rotational direction.

[Present Disclosure 11]

The tire according to any one of Present Disclosures 1 to 10, wherein each of the first shoulder blocks is provided with one longitudinal narrow groove extending with a constant groove width so as to communicate with the respective two of the first oblique grooves adjacent thereto on both sides in the tire circumferential direction.

[Present Disclosure 12]

The tire according to claim 11, wherein the longitudinal narrow groove is inclined to the first tread edge side as it goes toward the heel side in the tire rotational direction.

[Present Disclosure 13]

The tire according to claim 12, wherein the sipes on the ground contacting surface of each of the first shoulder blocks include a plurality of first shoulder sipes extending linearly from a respective one of the longitudinal narrow grooves to at least the first tread edge.

[Present Disclosure 14]

The tire according to any one of Present Disclosures 1 to 13, wherein each of the first middle blocks is provided with one middle short groove communicating with one of the first oblique grooves adjacent to the each of the first middle blocks and terminating so as to have a closed end within the ground contacting surface of the each of the first middle blocks.

[Present Disclosure 15]

The tire according to any one of Present Disclosures 1 to 14, wherein the tread portion includes a tread rubber forming the ground contacting surfaces of the blocks, the tread rubber has a rubber hardness in the range from 50 to 65 degrees, and the rubber hardness is measured by a type-A durometer in an environment of 23 degrees Celsius in accordance with the Japanese Industrial Standards JIS-K6253.

[Present Disclosure 16]

The tire according to claim any one of Present Disclosures 1 to 15, wherein the sipes include first sipes each extending in a zigzag manner and second sipes each extending linearly in a tread plan view, and each of the second sipes extends in a zigzag manner in the tire radial direction in a cross section perpendicular to the longitudinal direction thereof.

[Present Disclosure 17]

The tire according to Present Disclosure 13, wherein the sipes on the ground contacting surface of each of the first shoulder blocks further include a plurality of second shoulder sipes each extending in a zigzag manner from a respective one of the first shoulder longitudinal grooves to a respective one of the longitudinal narrow grooves.

[Present Disclosure 18]

The tire according to Present Disclosure 17, wherein each of the first shoulder sipes includes a first portion, a second portion, and a third portion having different depths from each other and arranged in this order from the longitudinal narrow groove to the first tread edge side, the first portion has a maximum depth of the each of the first shoulder sipes, the second portion has a depth smaller than the maximum depth of the first portion, and the third portion has a depth smaller than the depth of the second portion.

[Present Disclosure 19]

The tire according to Present Disclosure 18, wherein each of the second shoulder sipes includes a second first portion, a second portion, and a second third portion having different depths from each other and arranged in this order from the first shoulder longitudinal groove to the longitudinal narrow groove, the second portion has a maximum depth of the each of the second shoulder sipes, and the second third portion has a depth larger than a depth of the second first portion and smaller than the maximum depth.

[Present Disclosure 20]

The tire according to Present Disclosure 19, wherein the sipes on the ground contacting surface of each of the middle blocks are middle sipes extending in a zigzag manner in the tire axial direction, each of the middle sipes has shallow bottom portions at both ends thereof, and each of the shallow bottom portions has a depth in the range from 20% to 35% of a maximum depth of the each of the middle sipes.

DESCRIPTION OF REFERENCE SIGNS

2 tread portion
3 groove
4 block
6 first oblique groove
7 second oblique groove
8 first shoulder longitudinal groove
10 sipe
11 first crown longitudinal groove
15 crown block
16 first middle block
18 first shoulder block
R tire rotational direction
T1 first tread edge
T2 second tread edge
SDc sipe density of crown block
SDm sipe density of first middle block
SDs sipe density of first shoulder block

The invention claimed is:

1. A tire having a tread portion bound with an intended tire rotational direction, wherein the tread portion comprising:

a first tread edge;

a second tread edge;

a plurality of grooves provided between the first tread edge and the second tread edge; and a plurality of blocks divided by the grooves, wherein the grooves include a plurality of first oblique grooves, a plurality of second oblique grooves, a plurality of first shoulder longitudinal grooves, and a plurality of first crown longitudinal grooves, each of the first oblique grooves extends obliquely to a heel side in the tire rotational direction at least from the first tread edge toward a tire equator side, each of the second oblique grooves extends obliquely to the heel side in the tire rotational direction at least from the second tread edge toward the tire equator side, each of the first shoulder longitudinal grooves extends in the tire circumferential direction so as to communicate with a respective two of the first oblique grooves adjacent to each other in the tire circumferential direction, the first crown longitudinal grooves are disposed between the first shoulder longitudinal grooves and the tire equator and each communicate with two of the first oblique grooves adjacent thereto on both sides in the tire circumferential direction, each of the first oblique grooves terminates in conjunction with one of the second oblique grooves, each of the second oblique grooves terminates in conjunction with one of the first oblique grooves, the blocks include a plurality of crown blocks, a plurality of first shoulder blocks, and a plurality of first middle blocks, the crown blocks are arranged on the tire equator, each of the first shoulder blocks includes the first tread edge and is demarcated by a respective two of the first oblique grooves adjacent to each other in the tire circumferential direction and a respective one of the first shoulder longitudinal grooves between the respective two of the first oblique grooves, the first middle blocks are disposed between the crown blocks and the first shoulder blocks, each of the first shoulder blocks, the first middle blocks, and the crown blocks has a ground contacting surface provided with a plurality of sipes, for each of the blocks, when a sipe density (mm/mm$^2$) is defined as a value of a total length (mm) of the sipes formed on the ground contacting surface divided by an area (mm$^2$) of the ground contacting surface, a sipe density SDc of each of the crown blocks, a sipe density SDm of each of the first middle blocks, and a sipe density SDs of each of the first shoulder blocks satisfy SDc>SDs and SDm>SDs, each of the first shoulder blocks is provided with one longitudinal narrow groove extending with a constant groove width so as to communicate with the respective two of the first oblique grooves adjacent thereto on both sides in the tire circumferential direction, the longitudinal narrow groove is inclined to the first tread edge side as it goes toward the heel side in the tire rotational direction the sipes on the ground contacting surface of each of the first shoulder blocks include a plurality of first shoulder sipes extending linearly from a respective one of the longitudinal narrow grooves to at least the first tread edge, and a plurality of second shoulder sipes each extending in a zigzag manner from a respective one of the first shoulder longitudinal grooves to the respective one of the longitudinal narrow grooves, each of the first shoulder sipes includes a first portion, a second portion, and a third portion having different depths from each other and arranged in this order from the longitudinal narrow groove to the first tread edge side, the first portion has a maximum depth of the each of the first shoulder sipes, the second portion has a depth smaller than the maximum depth of the first portion, and the third portion has a depth smaller than the depth of the second portion.

2. The tire according to claim 1, wherein the sipe density SDs is in the range from 0.10 to 0.15 (mm/mm$^2$).

3. The tire according to claim 1, wherein each of the sipe density SDc and the sipe density SDm is in the range from 0.17 to 0.23 (mm/mm$^2$).

4. The tire according to claim 1, wherein each of the sipe density SDc and the sipe density SDm is in the range from 140% to 160% of the sipe density SDs.

5. The tire according to claim 1, wherein the sipe density SDc is in the range from 80% to 120% of the sipe density SDm.

6. The tire according to claim 1, wherein a tread width is in the range from 75% to 85% of a nominal width of the tire, and the tread width is a distance in the tire axial direction between the first tread edge and the second tread edge.

7. The tire according to claim 1, wherein each of the sipes is arranged at an angle of 15 degrees or less with respect to the tire axial direction.

8. The tire according to claim 1, wherein the blocks include second middle blocks and second shoulder blocks, each of the second middle blocks is adjacent to a respective one of the crown blocks on the second tread edge side via a respective one of the grooves, each of the second shoulder blocks is adjacent to a respective one of the second middle blocks on the second tread edge side via a respective one of the grooves, the tread portion has a plurality of V-shaped block groups arranged in the tire circumferential direction, and each of the block groups includes one of the crown blocks, one of the first middle blocks, one of the second middle blocks, one of the first shoulder blocks, and one of the second shoulder blocks.

9. The tire according to claim 1, wherein the first oblique grooves include main first oblique grooves and sub first oblique grooves arranged alternately in the tire circumferential direction, each of the main first oblique grooves terminates on the second tread edge side of the tire equator, and each of the sub first oblique grooves terminates without crossing the tire equator.

10. The tire according to claim 1, wherein each of the first shoulder longitudinal grooves has a groove width continuously increasing toward the heel side in the tire rotational direction.

11. The tire according to claim 1, wherein each of the first middle blocks is provided with one middle short groove communicating with one of the first oblique grooves adjacent to the each of the first middle blocks and terminating so as to have a closed end within the ground contacting surface of the each of the first middle blocks.

12. The tire according to claim 1, wherein the tread portion includes a tread rubber forming the ground contacting surfaces of the blocks, the tread rubber has a rubber hardness in the range from 50 to 65 degrees, and the rubber hardness is measured by a type-A durometer in an environment of 23 degrees Celsius in accordance with the Japanese Industrial Standards JIS-K6253.

13. The tire according to claim 1, wherein the sipes include first sipes each extending in a zigzag manner and second sipes each extending linearly in a tread plan view, and each of the second sipes extends in a zigzag manner in the tire radial direction in a cross section perpendicular to the longitudinal direction thereof.

14. A tire having a tread portion bound with an intended tire rotational direction, wherein the tread portion comprising:

a first tread edge;

a second tread edge;

a plurality of grooves provided between the first tread edge and the second tread edge; and a plurality of blocks divided by the grooves, wherein the grooves include a plurality of first oblique grooves, a plurality of second oblique grooves, a plurality of first shoulder longitudinal grooves, and a plurality of first crown longitudinal grooves, each of the first oblique grooves extends obliquely to a heel side in the tire rotational direction at least from the first tread edge toward a tire equator side, each of the second oblique grooves extends obliquely to the heel side in the tire rotational direction at least from the second tread edge toward the tire equator side, each of the first shoulder longitudinal grooves extends in the tire circumferential direction so as to communicate with a respective two of the first oblique grooves adjacent to each other in the tire circumferential direction, the first crown longitudinal grooves are disposed between the first shoulder longitudinal grooves and the tire equator and each communicate with two of the first oblique grooves adjacent thereto on both sides in the tire circumferential direction, each of the first oblique grooves terminates in conjunction with one of the second oblique grooves, each of the second oblique grooves terminates in conjunction with one of the first oblique grooves, the blocks include a plurality of crown blocks, a plurality of first shoulder blocks, and a plurality of first middle blocks, the crown blocks are arranged on the tire equator, each of the first shoulder blocks includes the first tread edge and is demarcated by a respective two of the first oblique grooves adjacent to each other in the tire circumferential direction and a respective one of the first shoulder longitudinal grooves between the respective two of the first oblique grooves, the first middle blocks are disposed between the crown blocks and the first shoulder blocks, each of the first shoulder blocks, the first middle blocks, and the crown blocks has a ground contacting surface provided with a plurality of sipes, for each of the blocks, when a sipe density (mm/mm²) is defined as a value of a total length (mm) of the sipes formed on the ground contacting surface divided by an area (mm²) of the ground contacting surface, a sipe density SDc of each of the crown blocks, a sipe density SDm of each of the first middle blocks, and a sipe density SDs of each of the first shoulder blocks satisfy SDc >SDs and SDm>SDs, each of the first shoulder blocks is provided with one longitudinal narrow groove extending with a constant groove width so as to communicate with the respective two of the first oblique grooves adjacent thereto on both sides in the tire circumferential direction, the longitudinal narrow groove is inclined to the first tread edge side as it goes toward the heel side in the tire rotational direction, the sipes on the ground contacting surface of each of the first shoulder blocks include a plurality of first shoulder sipes extending linearly from a respective one of the longitudinal narrow grooves to at least the first tread edge and a plurality of second shoulder sipes each extending in a zigzag manner from a respective one of the first shoulder longitudinal grooves to a respective one of the longitudinal narrow grooves, each of the first shoulder sipes includes a first portion, a second portion, and a third portion having different depths from each other and arranged in this order from the longitudinal narrow groove to the first tread edge side, the first portion has a maximum depth of the each of the first shoulder sipes, the second portion has a depth smaller than the maximum depth of the first portion, the third portion has a depth smaller than the depth of the second portion, each of the second shoulder sipes includes a second first portion, a second second portion, and a second third portion having different depths from each other and arranged in this order from the first shoulder longitudinal groove to the longitudinal narrow groove, the second second portion has a maximum depth of the each of the second shoulder sipes, and the second third portion has a depth larger than a depth of the second first portion and smaller than the maximum depth.

15. A tire having a tread portion bound with an intended tire rotational direction, wherein the tread portion comprising:

a first tread edge;

a second tread edge;

a plurality of grooves provided between the first tread edge and the second tread edge; and a plurality of blocks divided by the grooves, wherein the grooves include a plurality of first oblique grooves, a plurality of second oblique grooves, a plurality of first shoulder longitudinal grooves, and a plurality of first crown longitudinal grooves, each of the first oblique grooves extends obliquely to a heel side in the tire rotational direction at least from the first tread edge toward a tire equator side, each of the second oblique grooves extends obliquely to the heel side in the tire rotational direction at least from the second tread edge toward the tire equator side, each of the first shoulder longitudinal grooves extends in the tire circumferential direction so as to communicate with a respective two of the first oblique grooves adjacent to each other in the tire circumferential direction, the first crown longitudinal grooves are disposed between the first shoulder longitudinal grooves and the tire equator and each communicate with two of the first oblique grooves adjacent thereto on both sides in the tire circumferential direction, each of the first oblique grooves terminates in conjunction with one of the second oblique grooves, each of the second oblique grooves terminates in conjunction with one of the first oblique grooves, the blocks include a plurality of crown blocks, a plurality of first shoulder blocks, and a plurality of first middle blocks, the crown blocks are arranged on the tire equator, each of the first shoulder blocks includes the first tread edge and is demarcated by a respective two of the first oblique grooves adjacent to each other in the tire circumferential direction and a respective one of the first shoulder longitudinal grooves between the respective two of the first oblique grooves, the first middle blocks are disposed between the crown blocks and the first shoulder blocks, each of the first shoulder blocks, the first middle blocks, and the crown blocks has a ground contacting surface provided with a plurality of sipes, for each of the blocks, when a sipe density (mm/mm²) is defined as a value of a total length (mm) of the sipes formed on the ground contacting surface divided by an area (mm²) of the ground contacting surface, a sipe density SDc of each of the crown blocks, a sipe density SDm of each of the first middle blocks, and a sipe density SDs of each of the first shoulder blocks satisfy SDc>SDs and SDm>SDs, each of the first shoulder blocks is provided with one longitudinal narrow groove extending with a constant groove width so as to communicate with the respective two of the first oblique grooves adjacent thereto on both sides in the tire circumferential direction, the longitudinal narrow groove is inclined to the first tread edge side as it goes toward the heel side in the tire rotational direction, the sipes on the ground contacting surface of each of the first shoulder blocks include a plurality of first shoulder sipes extending linearly from a respective one of the longitudinal narrow grooves to at least the first tread edge and a plurality of second shoulder sipes each extending in a zigzag manner from a respective one of the first shoulder longitudinal grooves to a respective one of the longitudinal narrow grooves, each of the first shoulder sipes includes a first portion, a second portion, and a third portion having different depths from each other and arranged in this order from the longitudinal narrow groove to the first tread edge side, the first portion has a maximum depth of the each of the first shoulder sipes, the second portion has a depth smaller than the maximum depth of the first portion, the third portion has a depth smaller than the depth of the second portion, each of the second shoulder sipes includes a second first portion, a second second portion, and a second third portion having different depths from each other and arranged in this order from the first shoulder longitudinal groove to the longitudinal narrow groove, the second second portion has a maximum depth of the each of the second shoulder sipes, the second third portion has a depth larger than a depth of the second first portion and smaller than the maximum depth, the sipes on the ground contacting surface of each of the middle blocks are middle sipes extending in a zigzag manner in the tire axial direction, each of the middle sipes has shallow bottom portions at both ends thereof, and each of the shallow bottom portions has a depth in the range from 20% to 35% of a maximum depth of the each of the middle sipes.

\* \* \* \* \*